United States Patent
Molinsky et al.

(10) Patent No.: US 10,636,103 B2
(45) Date of Patent: Apr. 28, 2020

(54) SYSTEM AND METHOD FOR INTEGRATED ADVANCE LIFE PLANNING

(75) Inventors: Bradley D. Molinsky, Bloomfield, CT (US); Karen L. Reich, Hartford, CT (US); Nathaniel J. Wilson, Windsor, CT (US)

(73) Assignee: Hartford Fire Insurance Company, Hartford, CT (US)

(*) Notice: Subject to any disclaimer, the term of this patent is extended or adjusted under 35 U.S.C. 154(b) by 979 days.

(21) Appl. No.: 12/330,009

(22) Filed: Dec. 8, 2008

(65) Prior Publication Data

US 2009/0171828 A1    Jul. 2, 2009

Related U.S. Application Data

(60) Provisional application No. 61/017,294, filed on Dec. 28, 2007.

(51) Int. Cl.
*G06Q 50/18* (2012.01)
*G06Q 40/00* (2012.01)

(52) U.S. Cl.
CPC ............. *G06Q 50/18* (2013.01); *G06Q 40/00* (2013.01); *G06Q 50/186* (2013.01)

(58) Field of Classification Search
CPC ... G06Q 10/1057; G06Q 10/105; G06Q 50/24
USPC ....................................... 705/312, 1
See application file for complete search history.

(56) References Cited

U.S. PATENT DOCUMENTS

| | | | |
|---|---|---|---|
| 5,241,466 A | 8/1993 | Perry et al. | |
| 6,246,991 B1 | 6/2001 | Abe et al. | |
| 7,039,681 B2 | 5/2006 | Nolte et al. | |
| 7,454,379 B1 | 11/2008 | Wolzenski et al. | |
| 2002/0019744 A1 | 2/2002 | Yamamoto | |
| 2003/0163483 A1* | 8/2003 | Zingher et al. | 707/104.1 |
| 2003/0182290 A1* | 9/2003 | Parker | 707/100 |
| 2003/0212611 A1* | 11/2003 | Barrott et al. | 705/27 |
| 2004/0025072 A1* | 2/2004 | Mau | 713/400 |
| 2004/0143464 A1* | 7/2004 | Houle et al. | 705/4 |
| 2007/0156558 A1 | 7/2007 | Wolzenski et al. | |
| 2008/0086314 A1* | 4/2008 | Fitzpatrick | 705/1 |

* cited by examiner

*Primary Examiner* — Julie M Shanker
(74) *Attorney, Agent, or Firm* — Howard IP Law Group, PC

(57) ABSTRACT

An integrated advance life planning and management system provides to a user, through a single convenient Internet interface, a plurality of advance life planning and management services including estate planning, will preparation, and funeral planning services.

9 Claims, 7 Drawing Sheets

FIG. 3

SYSTEM AND METHOD FOR INTEGRATED ADVANCE LIFE PLANNING

CROSS REFERENCE TO RELATED APPLICATIONS

The present application claims priority to, and hereby incorporates herein by reference in its entirety, U.S. Provisional Patent Application 61/017,294, filed Dec. 28, 2007.

TECHNICAL FIELD

The present invention relates to a system and method for automatically planning and managing advance life services and, more particularly, for automatically planning and managing estate planning services, wills, and funeral services.

BACKGROUND

Decisions regarding an individual's eventual death are known as advance life planning. Various tools are available to assist individuals in making these decisions, such as kits to assist in will preparation, or services to assist planning for a funeral. However, since most individuals do not plan ahead for their own funerals, family members of a deceased individual typically bear the burden of meeting funeral expenses until life insurance proceeds are distributed. Loans may be available to cover funeral expenses, but obtaining a loan requires burdensome effort at an already difficult time.

Also, the death care industry is highly fragmented, and consumers are faced with myriads of choices. Often, family members make these choices while suffering the emotional strain caused by the death of a loved one. Perhaps for the first time, the family members of a deceased individual learn about estate planning and/or insurance to assist with death expenses. Unfortunately, these services are not available after death.

Therefore, there is a need for a simplified integrated approach to advance life planning and management, including better management of funeral costs.

SUMMARY OF THE INVENTION

Accordingly, the present invention provides an integrated advance life planning and management system by which a user can obtain estate planning, will preparation, and funeral planning services through a single convenient interface.

In one aspect of the present invention, an integrated advance life planning and management system communicates with a user terminal via the Internet. The system includes means for communicating with the user terminal, a processor, and a data storage device. The data storage device is configured to store at least one of a program for execution by the processor and a database having user data fields associated with a user profile. Execution of the program configures the processor to provide to the user terminal, via the means for communicating and the Internet, a plurality of advance life planning and management services. Execution of the program also configures the processor to receive from the user terminal data related to the services provided via the Internet. The processor is also configured by execution of the program to generate a table identifying common fields of the user profile that are used by more than one of the plurality of services, and to modify at least one of the common fields in response to the received data.

In another aspect of the present invention, an integrated advance life planning and management system communicates with a user terminal and with a data storage device. The data storage device stores a database having user data fields associated with a user profile. The system includes a processor and means for communicating with the user terminal and the data storage device. The processor is configured to provide to the user terminal a plurality of advance life planning and management services. The processor also is configured to generate a table identifying common fields of the user profile that are used by more than one of the plurality of services, to receive data from the user terminal in response to at least one of the plurality of services, and to modify at least one of the common fields of the user profile in response to the data received from the user terminal.

In another aspect of the present invention, a computer program product includes a computer-readable medium encoded with instructions for configuring a processor to perform a method for providing a plurality of advance life planning and management services. The method includes the steps of communicating with a user terminal and with a database storing data fields of a user profile; providing to the user terminal at least one of a plurality of advance life planning and management services; generating a table to identify common fields of the user profile that are used by more than one of the plurality of services; receiving data from the user terminal in response to at least one of the plurality of services; and modifying at least one of the common fields in response to the data received from the user terminal.

In another aspect of the present invention, a method for providing at least one of a plurality of advance life planning and management services includes the steps of: providing a processor and a database storing data fields of a user profile; placing the processor in communication with the database and with the user terminal; configuring the processor to perform a method comprising the steps of communicating with the user terminal and with the database, providing to the user terminal at least one of a plurality of advance life planning and management services, generating a table identifying common fields of the user profile that are used by more than one of the plurality of services, receiving data from the user terminal in response to at least one of the plurality of services, and modifying at least one of the common fields in response to the data received from the user terminal; and providing a means for electronic access to the system.

These and other objects, features, and advantages of the present invention will become apparent in light of the detailed description of the best mode embodiment thereof, as illustrated in the accompanying drawings.

BRIEF DESCRIPTION OF THE DRAWINGS

FIG. 3 is a graphic representation of a user interface screen in accordance with an embodiment of the present invention;

DETAILED DESCRIPTION OF PREFERRED EMBODIMENTS

Figure 1:
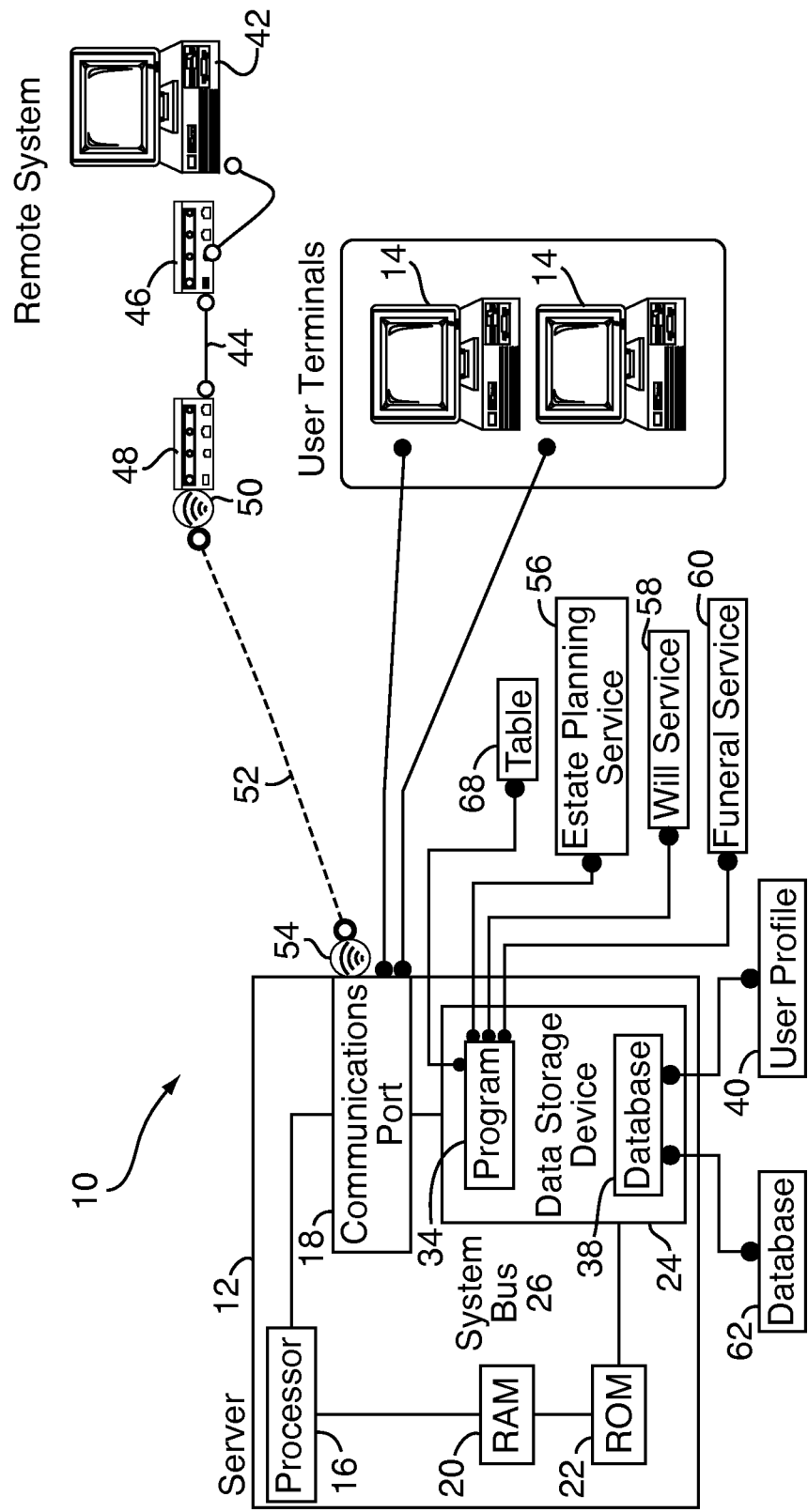
FIG. 1 is a schematic diagram of an integrated advance life planning and management system in accordance with an embodiment of the present invention.

Referring to FIG. 1, an integrated advance life planning and management system 10 includes at least one central processing computer or computer network server 12 in communication with at least one user terminal 14. The server 12 includes at least one processor or central processing unit (CPU) 16, at least one communication port 18, at least one random access memory (RAM) 20, at least one read only memory (ROM) 22 and at least one data storage device 24. All of these latter elements are in communication with the processor 16 via a system bus 26.

Figure 2:
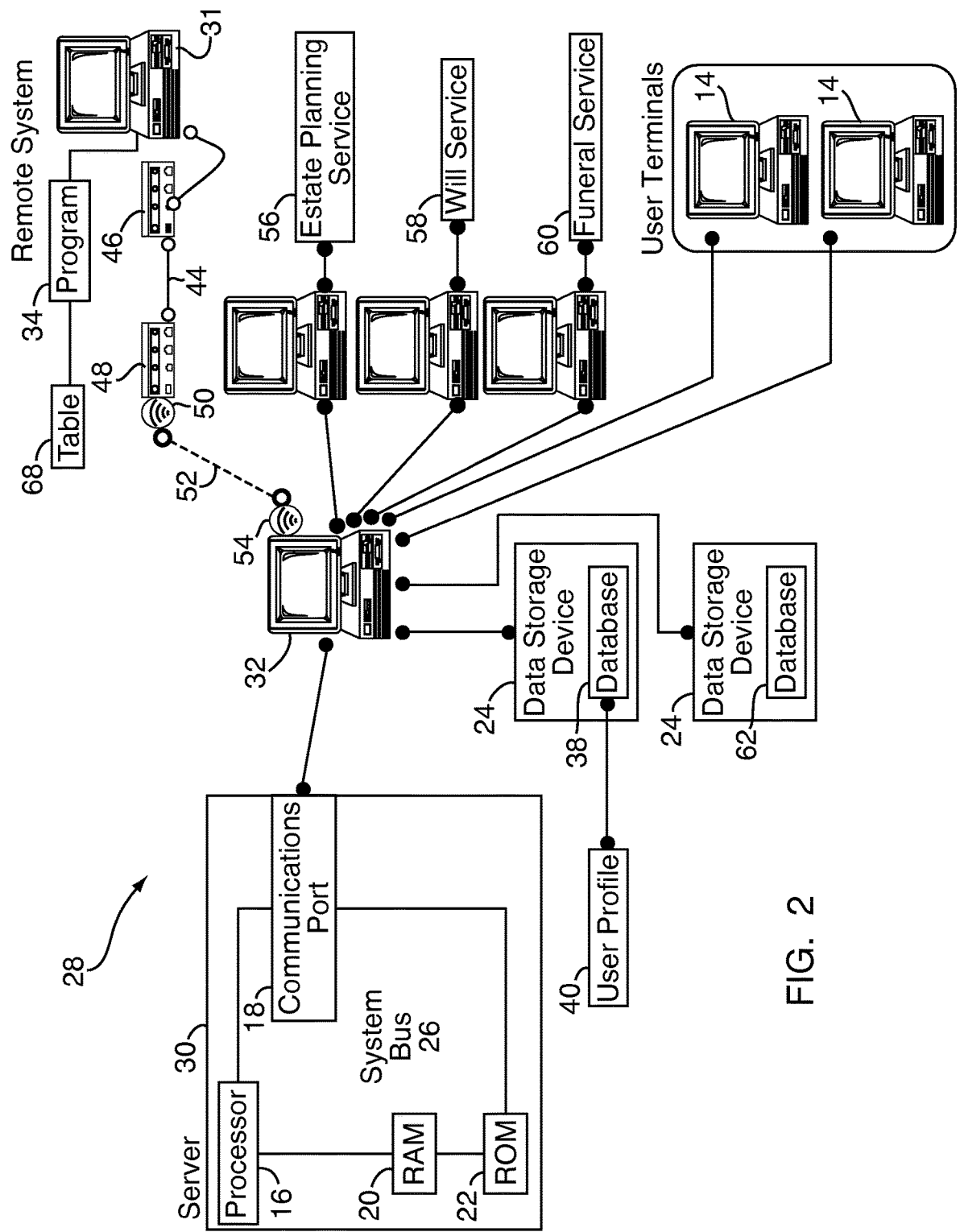
FIG. 2 is a schematic diagram of an integrated advance life planning and management system in accordance with an alternate embodiment of the present invention.

Referring to FIG. 2, wherein like reference numbers refer to like components from FIG. 1, an integrated advance life planning and management system may also be configured in a distributed architecture 28, wherein data storage devices 24 and processors 16 are housed in separate distributed servers 30. At least some of the distributed servers 30 perform primary processing functions and contain a random access memory (RAM) 20 and a read only memory (ROM) 22 in addition to a processor 16 and a data storage device 24. In the distributed system 28, each of the distributed servers 30 is attached to a communications hub or port 32 that serves as a primary communication link with other distributed servers, user terminals, and related devices. The communications hub or port 32 may have minimal processing capability itself, serving primarily as a communications router. A variety of communications protocols may be part of the system, including but not limited to: Ethernet, SAP, SAS™, ATP, Bluetooth, and TCP/IP.

The user terminal 14 may include any one or a combination of a keyboard, a computer display, a touch screen, LCD, voice recognition software, an optical or magnetic read head, or other input/output devices required to implement the above functionality.

The processor 16 can include one or more conventional microprocessors and one or more supplementary co-processors such as math co-processors.

The communication port 18 may include multiple communication channels for simultaneous communication. Devices in communication with each other need not be continually transmitting to each other. On the contrary, such devices need only transmit to each other as necessary, may actually refrain from exchanging data most of the time, and may require several steps to be performed to establish a communication link between the devices. For example, the communication port 18 may include wire modems, wireless radio, infrared, visible laser, UV laser transceivers, audio transceivers, or other means for communicating.

Still referring to FIG. 1, the processor 16 also is in communication with the data storage device 24. The data storage device 24 may comprise an appropriate combination of magnetic, optical and/or semiconductor or flash memory, and may include, for example, RAM, ROM, an optical disc such as a compact disc, a hard disk or drive, or any other non-ephemeral computer readable medium. The processor 16 and the data storage device 24 each may be, for example, located entirely within a single computer or other computing device; or connected to each other by a communication medium, such as a USB port, serial port cable, a coaxial cable, a Ethernet type cable, a telephone line, a radio frequency transceiver or other similar wireless or wireline medium.

The data storage device 24 of the system 10 may be configured to store, for example, (i) a program and/or algorithm(s) 34 (e.g., computer program code and/or a computer program product) adapted to configure the processor 16 of server 12 to perform a computerized method 36 of integrated advance life planning and management, as described in detail hereinafter with reference to FIG. 4; and/or (ii) at least one database 38 configured to store information required, manipulated, or produced by the processor 16 of the server 12 according to the computerized method 36 of the program 34. The database 38 may include data fields specific to a user profile 40 as will be discussed below.

The program 34 may be stored, for example, in a compressed, an uncompiled and/or an encrypted format, and may include computer program code. The instructions of the program may be read from the data storage device 24 into the RAM 20 associated with the processor 16. While execution of sequences of instructions in the program 34 will cause the processor to perform the steps of the computerized method 36 as described below, hard-wired circuitry may be used as means for configuring the processor 16 to perform the computerized method 36 in place of, or in combination with, the data storage device 24 storing the program 34. Thus, embodiments of the present invention are not limited to any specific combination of hardware and software.

Alternatively, as shown in FIG. 2, the program 34 may be embodied in another computer-readable medium that provides or participates in providing instructions to the processor 16 (or any other processor of a computing device described herein) for execution. The computer-readable medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, RAM, PROM, EPROM or EEPROM (electronically erasable programmable read-only memory), FLASH-EEPROM, any other memory chip or cartridge, a carrier wave as described hereinafter, or any other medium from which a computer can read.

Various forms of the computer-readable medium may be involved in configuring the processor 16 (or any other processor of a device described herein) to perform the computerized method 36. For example, as shown in FIG. 2, the instructions may initially be borne on a magnetic disk of a remote computer 42. The remote computer 42 can load the instructions into its dynamic memory and send the instructions over a telephone line 44 using a first modem 46. A second modem 48 local to a computing device (e.g., the server 12) can receive the data on the telephone line 44 and use an infrared transmitter 50 to convert the data to a wireless signal 52. An infrared detector 54 can receive the data carried in the wireless signal 52 and send the data to the system bus 26 via the communication port 18. The system bus 26 carries the data to RAM 20, from which the processor 16 retrieves and executes the instructions. The instructions received by RAM 20 may optionally be stored in memory either before or after execution by the processor 16. In addition, instructions may be received via the communication port 18 as electrical, electromagnetic or optical signals, which are exemplary forms of wireless carrier waves that carry data streams representing various types of information.

The program 34 configures the processor 16 to communicate with the data storage device 24 and with communication port 18, which is in communication with the user terminal 14. The program 34 also may include program elements such as an operating system, a database management system and "device drivers" that allow the processor to interface with computer peripheral devices (e.g., a video display, a keyboard, a computer mouse). The program 34 further configures the processor 16 to perform the computerized method 36. In performing the computerized method 36, the processor 16 can directly provide to the user terminal 14 a plurality of integrated advance life planning and management services such as an estate planning service 56, a will preparation service 58, and a funeral planning service 60; or the processor 16 can communicate via the communication port 18 with other devices providing such services, and relay the services to the user terminal 14.

In some embodiments, the program 34 may include submodules for accomplishing the plurality of services 56, 58, 60; in other embodiments, the plurality of services 56, 58, 60 may be provided by other programs stored on the data storage device 24 or on similar devices.

Some of the data fields in the database 38 may be common fields accessed by more than one of the planning and management services 56, 58, 60. Suitable additional means may be provided for performing numerous other functions such as mapping common fields between advance life planning services. Such additional means can include computer program code, hardwired circuitry, or other equivalent means for implementing the above functions (and the other functions described herein).

Referring to FIGS. 1 and 2, to use the integrated advance life planning and management system 10 of the present invention, a user, who may be an employee insured by his/her employer's group insurance plan, accesses the system 10 from the user terminal 14. From the user terminal 14, the user is linked through the communications port 18, 32 to the processor 16. As shown in FIG. 3, the processor 16 is configured by execution of the program 34 to provide access to the integrated method 36 for providing advance life planning and management services 56, 58, 60.

Figure 4:
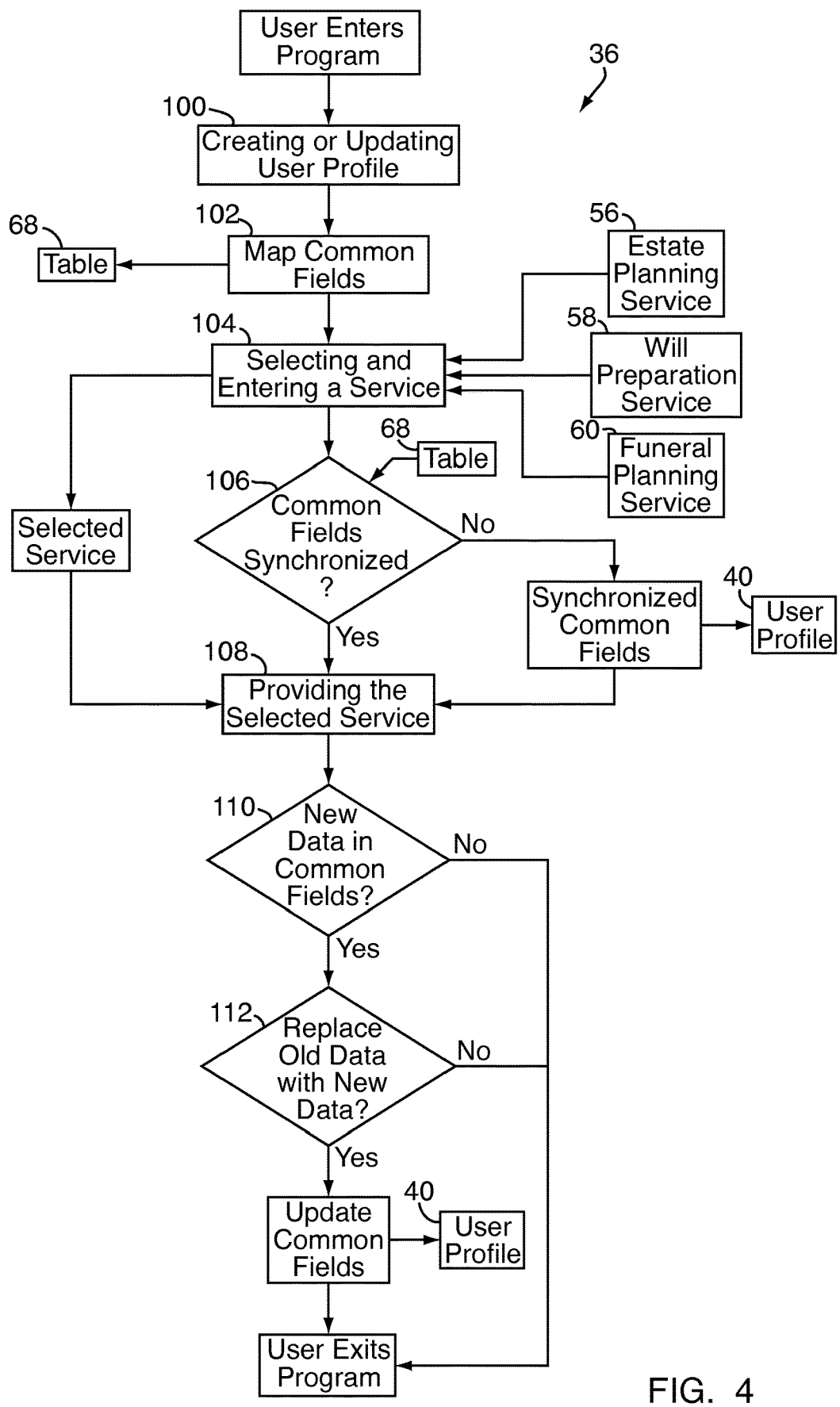
FIG. 4 is a flow chart of a computerized method for integrated advance life planning and management, as performed by the system of FIG. 1 or FIG. 2 in accordance with an embodiment of the present invention.

Referring to FIG. 4, the computerized method 36 includes a step 100 of creating or updating the user profile 40 by logging into the insurance company's secure web site/server and entering the program 34. After adding the new data, the user sends the instruction to update the user profile 40, which in one example may be by clicking on a 'Submit' button, and the user profile 40 is updated and stored on the database 38. The user initially enters personal information such as name, address, phone number, email address, birth date and/or other similar types of personal information to establish a corresponding user profile 40. The user may also enter names and addresses of third parties contacts such as relatives, friends and other acquaintances as part of the user profile 40.

Additionally, the user profile 40 can include data generated by the services 56, 58, 60. The user profile 40 is stored in fields of the database 38. At least a portion of the user profile 40 may be automatically generated from existing records stored within an insurance company's employee records databases 62.

The computerized method 36 further includes a step 102 of mapping fields 64 required in the user profile 40 with similar fields 66 in the employee records databases 62. If any of the user profile fields 64 are already stored in employee record fields 66, the information is retrieved and imported to the user profile 40. The step 102 also includes mapping common fields between and among the user profile 40 and advance life planning and management services 56, 58, 60. One example method of mapping includes manually cataloguing all fields in all services, then identifying which fields are common. Another method of mapping is by automated comparison of field values and data labels according to a set of heuristics built into the computerized method 36. The step 102 of mapping common fields produces a table 68, as shown in FIGS. 1, 2, and 4, that dynamically links each common field of the user profile 40 to the corresponding field in each service 56, 58, 60. Common fields may be, for example, name, address, phone number, number of dependants, marital status, or financial worth.

The computerized method 36 further includes a step 104 of selecting and entering any one of the advance life planning and management services 56, 58, 60.

Upon entering a selected one of the services, the computerized method proceeds to a step 106 of checking to determine whether all the common fields within the selected service are synchronized with the user profile 40 according to the table 68. If not, the fields within the selected service are updated.

The computerized method 36 further includes a step 108 of providing planning and management activities using the selected service.

Upon exiting the particular service, the computerized method proceeds to a step 110 of checking to determine whether any of the common fields within the particular service have changed. If so, the user can be prompted at an optional step 112 to replace the common field information in the user profile 40. If the user agrees, the common field information in the user profile 40 is replaced. Alternatively, data fields shared among all the other services also are automatically updated along with the corresponding common field of the user profile 40, and the user is notified of the updates.

Figure 5:
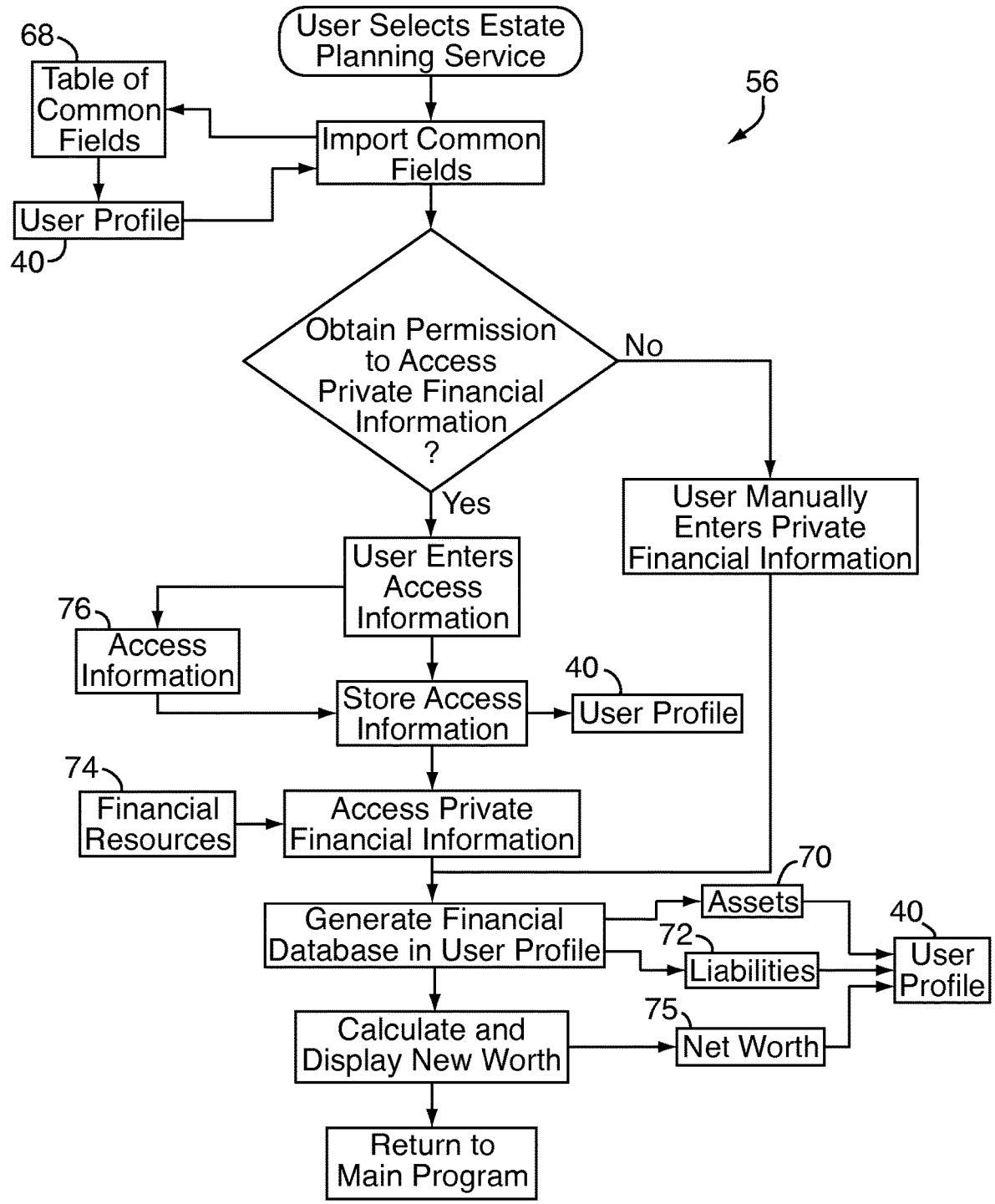
FIG. 5 is a flow chart of an estate planning service, as performed by the system of FIG. 1 or FIG. 2 in accordance with an embodiment of the present invention.

Referring to FIG. 5, one integrated advance life planning and management service provided by the computerized method 36 is the estate planning service 56. The estate planning service 56 receives data from the user to generate a database of the user's assets 70 (e.g., real property, bank accounts, cash certificates) and liabilities 72 (e.g., debts, taxes owed). Personal effects are catalogued to aid in disposition.

In one feature of the present invention, the user grants permission to the program 34 to access and download private financial information from several different sources 74, such as 401k plan information, pension funds, investments, life insurance policies, social security income, and real property holdings for example. This private information is imported to the database 38 and is stored in the fields of the user profile 40. When the user accesses the estate planning service 56, the data from common fields of the corresponding user profile 40 is imported to populate required fields. The user's total net worth 75 then can be accurately calculated using current data without the user having to manually track down, store, upload, and update the information.

In another feature of the present invention, all of the user's financial information 70, 72, 75 and asset sources 74 are dynamically linked to the user profile 40. For example, the user profile 40 may store account access information 76 for each of the user's financial resources 74. By connecting to the program 34, the user can authorize the program 34 to access the user's financial resources 74 using the stored account access information 76. In this manner, the various asset sources 74 are automatically updated when the user connects to the program 34 and may be periodically updated and stored in the user profile 40. The assets 70 and net worth 75 of the individual user may be calculated and used as input to the estate planning service 56.

Figure 6:
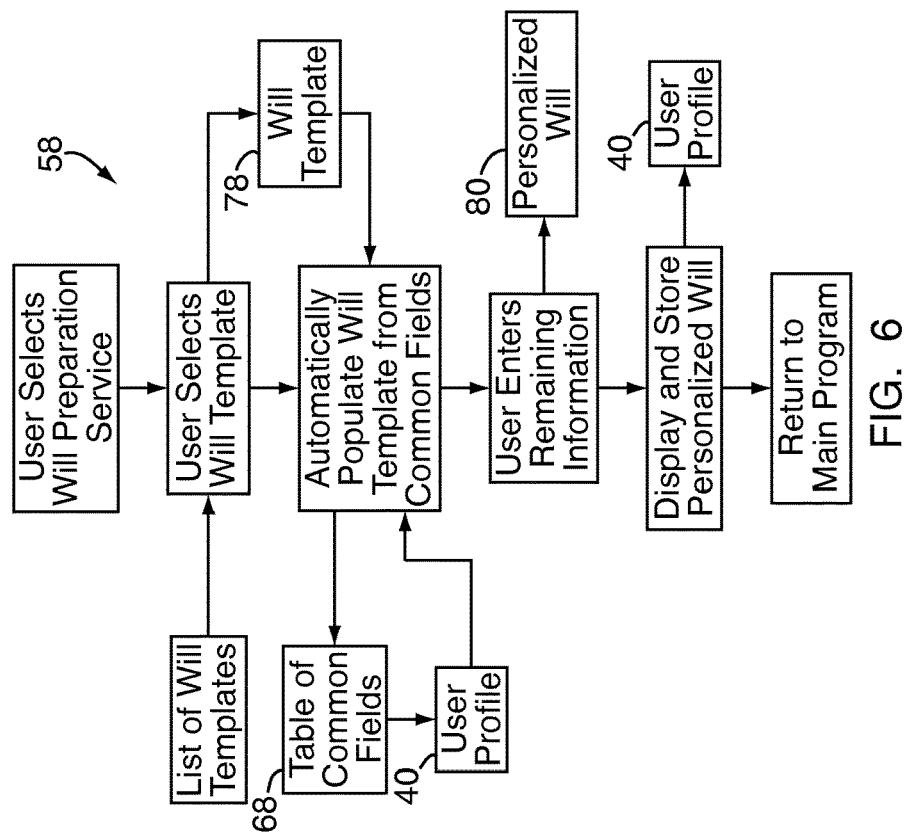
FIG. 6 is a flow chart of a will preparation service, as performed by the system of FIG. 1 or FIG. 2 in accordance with an embodiment of the present invention.

Referring to FIG. 6, another integrated advance life planning and management service is a last will and testament preparation service, or the will service 58. The processor 16 is configured by the program 34, as described above, either to directly provide the will service 58, or to connect the user terminal to an external device providing the will service 58. Once connected, the user interacts with the will service 58 to prepare a will that may be as brief or as complex as needed. The will service 58 provides a list of template wills, from which the user can select a will template 78. The user then enters their personal data into required fields of the will template 78 in order to complete preparation of a personalized will 80. Some of the required fields are duplicative of information already stored in the user profile 40 or created in one of the other services such as the estate planning service 56. The will preparation can be simplified by automatically populating fields of the will template 78, according to the table 68, if the information is already available in the user profile 40.

Figure 7:
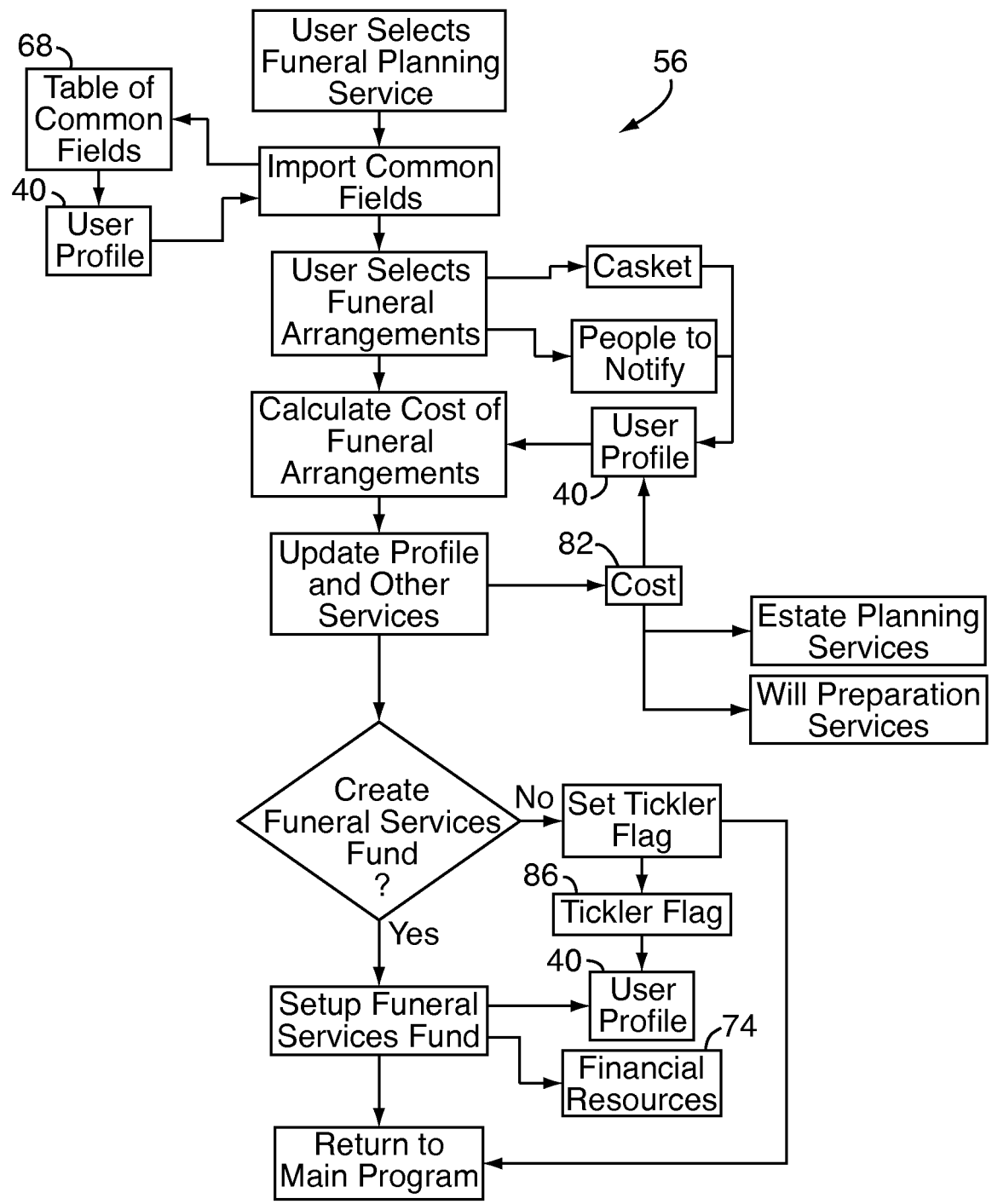
FIG. 7 is a flow chart of a funeral planning service, as performed by the system of FIG. 1 or FIG. 2 in accordance with an embodiment of the present invention.

Referring to FIG. 7, another integrated advance life planning and management service is the online funeral planning service, or funeral service 60. The user connects to the funeral service 60 through the program 34, as described. Once connected, the user plans and manages funeral arrangements in advance. Information available in any of the other integrated advance life planning services (or user profile 40), such as life insurance policies or investments, are imported to the funeral service 60 if needed, as discussed above with reference to the table 68. If necessary, the change in the individual's net worth due to funeral expenses or the like is communicated back to the user profile and updated accordingly.

In one feature of the present invention, the processor 16 is configured by the program 34 to inform the user of the cost 82 of the selected funeral services. In another feature of the present invention, the processor 16 is configured by the program 34 to update the various services 56, 58, 60 by deducting the cost 82 of selected funeral services amount from the anticipated life insurance policy benefit field of the user profile 40. Alternatively, the cost 82 of the selected funeral services is deducted from fields of the user profile 40 representing other assets of the individual.

In another feature of the present invention, the processor 16 is configured by the program 34 to recommend that the user authorize creation of a funeral services fund 84 to cover an insured individual's funeral cost 82. The fund 84 may be financed through increases to the insured individual's insurance premiums, or by some other method. In either scenario, the amount required to fulfill the obligations is small since the purpose of the fund 84 is to finance the "float" of the funeral expenses until such time as the life insurance proceeds are disbursed, typically four to six weeks. In this way, family members are not required to shoulder the financial burden of the funeral and burial. In one embodiment, the funeral services fund 84 can be used to pay interest on a short-term balloon loan for funeral expenses; the loan principal can be repaid from the proceeds of the life insurance policy carried by the user.

Optionally, the program 34 configures the processor 16 to add a tickler flag 86 to the user's profile 40. The program 34 also can configure the processor 16 to periodically check the database 38 for profiles 40 having tickler flags 86, so that each flagged user periodically will be reminded (via e-mail or other electronic means of communication, such as voicemail or text message) of their opportunity to create the fund 84.

The user may also generate, using the funeral planning service 60, a list of those he/she wishes to be notified at death, and the best means of contacting those people (email, fax, text message, telegram, etc.). Upon notification of death, the funeral service 60 initiates an automated notice to those named on the user's notification list.

Figure 8:
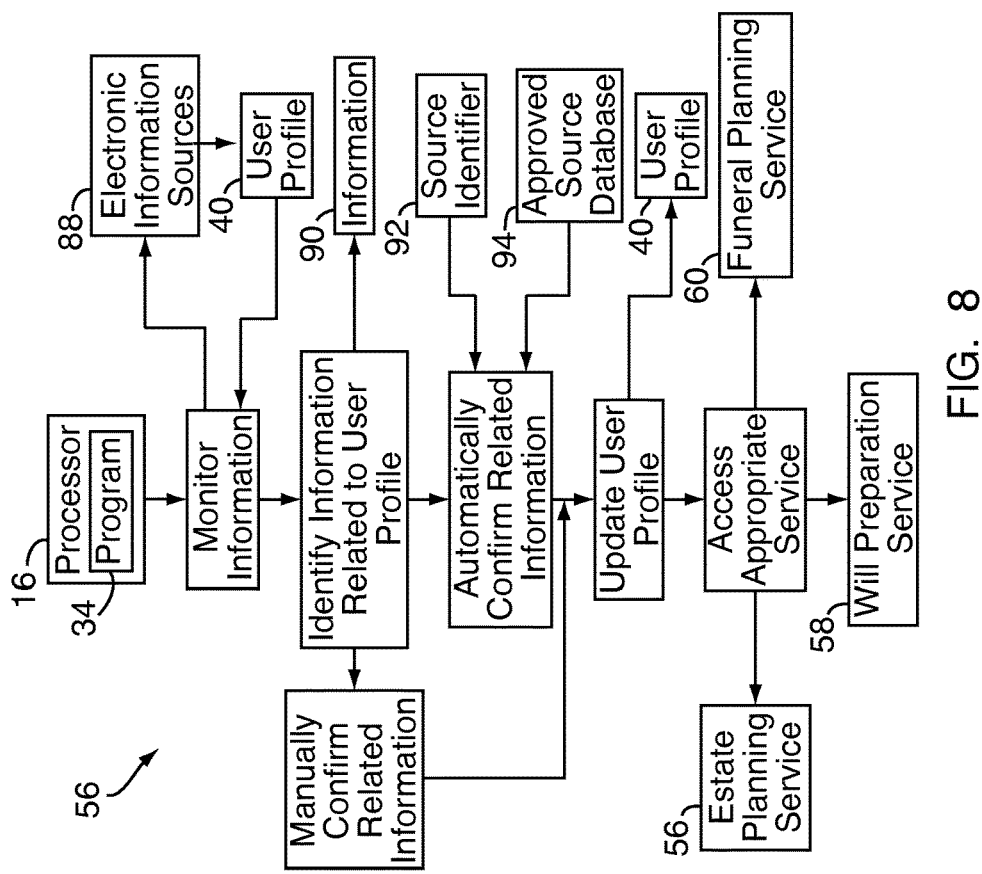
FIG. 8 is a flow chart of an information monitoring service, as performed by the system of FIG. 1 or FIG. 2 in accordance with an embodiment of the present invention.

In another feature of the present invention, as shown in FIG. 8, the processor 16 is configured by the program 34 to continuously or frequently monitor electronic information sources 88 for information 90 relating to the user, based on common fields of the user profile 40. The electronic information sources 88 may include Internet search agents, news feeds, scanned image files, typed documents, or other sources of data. The processor 16 is further configured, on identifying data 90 indicating a user event, to confirm the data 90 and to access a relevant life planning and management service 56, 58, 60. For example, if the processor 16 receives data 90 indicating a death of the user or of a user beneficiary, the processor 16 is configured to confirm the data 90 by contacting the survivor of the user or the beneficiary. On confirmation of the death, the processor 16 is further configured to access the funeral planning service 60 and/or to authorize disbursement of the funeral services fund. Alternatively, if the processor 16 receives data 90 indicating a user marriage or the birth or adoption of a user beneficiary, the processor 16 is configured to confirm the data 90 and then to access the estate planning service 56 and/or the will preparation service 58.

Optionally, the processor 16 also can be configured to receive data 90 tagged with a source identifier 92, and to compare the source identifier 92 to a database 94 of approved sources. If the source identifier 92 is matched in the approved source database 94, the processor 16 can be configured to auto-confirm the data 90. For example, licensed funeral directors can be listed in the approved source database 94. Data 90 submitted by a licensed funeral director related to a user's death would then be auto-confirmed, accelerating the payment of an insured user's life insurance proceeds.

One advantage of the present invention is that the individual generates the user profile 40 only once, and the information is stored in one central location (database 38) and disseminated across several services 56, 58, 60, thereby saving time and minimizing manual input errors. In the situation where information is collected electronically from other sources such as the insurance company databases 62 or financial institution, input errors are virtually eliminated. The integration of information collection results in a significant time savings on the part of insured user, and also results in a more accurate final product.

Another advantage of the present system is that key information can be generated in one service, for example the estate planning service 56, stored in the database 38, and passed to other services, for example the will service 58 and/or the funeral service 60, to effect synchronized document completion. This feature is particularly advantageous when the plurality of services is operated and maintained independent of each other. An insured individual can plan for advance life services in a "one stop shopping" environment.

Another advantage of the present system is that the program 34 may be configured to manage unified payment administration. In one example, the life insurance settlement may be stored in the databases 62 and disbursed to parties involved with the will service 58, such as probate costs, estate management fees, trustee administration fees, or attorney fees. Similarly, the life insurance settlement may be disbursed to parties involved with the funeral service 60, such as funeral home costs, headstone costs, or flower costs.

Another advantage of the present system is that the user may configure the funeral service 60 to comprise unified death event notification. Upon notification of death, the program 34 may initiate the funeral process, the probate process, the life insurance claim, and the notification of listed people.

Another advantage of the present system is that the user may configure the program 34 to automatically notify or remind the user of selected future dates, or the occurrence of an event. Another advantage of the present system is that the group buying power associated with the funeral service 60 (or any other service) may be leveraged to reduce the cost of funeral services such as caskets or headstones.

What is claimed is:

1. A computer system, the system in communication with a user terminal, the system comprising:
    a data storage device comprising:
    an employee database associated with a group benefits plan;
    a program comprising processor-executable instructions; and
    a database comprising a plurality of user profiles, each of the profiles comprising user data, fields; and
    a processor in communication with the data storage device, a user terminal, an estate planning server providing an estate planning service, a will preparation server providing a will preparation service, and a funeral planning server providing a funeral planning service, wherein the processor executes the program to:
    render a common graphical user interface on the user terminal for accessing the estate planning service, will preparation service, and funeral planning service, and receiving user data;
    automatically populate at least a portion of the user data fields of the user profiles from records stored in the employee database;
    map common fields between the user profile and one or more of the estate planning service, will preparation service and funeral planning service, by automated comparison of field values and data labels;
    based on the mapping, generate a table dynamically linking each common field of the user profile to a corresponding field in each of the estate planning service, will preparation service and funeral planning service;
    responsive to entry of one of the estate planning service, will preparation service and funeral planning service by a user, determine whether the common user data fields within the entered one of the estate planning service, will preparation service and funeral planning service are synchronized with the common user data fields of the user profile stored in the database, the common user data fields being determined according to the generated table;
    responsive to determining that one or more of the common user data fields within the entered one of the estate planning service, will preparation service and funeral planning service is not synchronized with the common user data fields of the user profile, synchronize the one or more common user data fields within the entered one of the estate planning service, will preparation service and funeral planning service to be synchronized with the common user data fields of the user profile stored in the database;
    responsive to exiting by the user of the entered one of the estate planning service, will preparation service and funeral planning service, determine whether any of the common user data fields within the entered one of the estate planning service, will preparation service and funeral planning service have been changed, the common user data fields being determined according to the generated table;
    responsive to determining that one or more of the common user data fields within the entered one of the estate planning service, will preparation service and funeral planning service have been changed, prompt the user to replace the data in the common user data field in the user profile with the changed data from the entered one of the estate planning service, will preparation service and funeral planning service;
    responsive to receiving user agreement to change the common user data field in response to the prompting of the user, synchronize the corresponding common user data fields of the user profile stored in the database that have been changed in the entered one of the estate planning service, will preparation service and funeral planning service with the data in the common user data fields, and, absent user agreement in response to the prompting of the user, maintain the common user data fields of the user profile stored in the database without change;
    receive account access information for a plurality of user financial resources and store the received account access information in data fields of the user profile;
    automatically, responsive to user access to the system, use the stored account access information to access financial information of the user, and store the accessed financial information in data fields of the user profile;
    calculate the assets, liabilities and net worth of the user based on the accessed financial information, and store the calculated assets, liabilities and net worth in the user profile;
    responsive to entry of the estate planning service by the user, synchronize the asset data, liability data and net worth data of the fields of the estate planning service with the common user data fields of the user profile stored in the database;
    receive data relating to the user based on fields of the user profile, the received data tagged with a source identifier; compare the source identifier to a database of approved sources;

responsive to matching the source identifier with an approved source in the database of approved sources, automatically confirm the received data, and responsive to the confirmed data indicating a user event, access one of the estate planning service, will preparation service, and funeral planning service corresponding to the confirmed data; and responsive to the user event being the death of the user, initiate one or more of a funeral process, a probate process, a life insurance claim and notification of listed people.

2. The system according to claim 1, wherein the processor further executes the program to provide a cost of planned funeral arrangements, and to recommend creation of a funeral services fund for paying the cost of planned funeral arrangements.

3. A computer program product, comprising a non-transitory computer-readable medium encoded with instructions for configuring a processor to:

communicate with a user terminal, an estate planning server providing an estate planning service, a will preparation server providing a will preparation service, and a funeral planning server providing a funeral planning service;

render a common graphical user interface on the user terminal for accessing the estate planning service, will preparation service, and funeral planning service, and for receiving user data;

communicate with a database of employee data and a database comprising a plurality of user profiles, each of the profiles comprising user data fields, and automatically populate at least a portion of the user data fields of the user profiles from records stored in the employee database; wherein the estate planning service, will preparation service, and funeral planning service use some user data fields in common with the user profile stored in the database;

map common fields between the user profile and one or more of the estate planning service, will preparation service and funeral planning service, by automated comparison of field values and data labels;

based on the mapping, generate a table dynamically linking each common field of the user profile to a corresponding field in each of the estate planning service, will preparation service and funeral planning service;

responsive to entry of one of the estate planning service, will preparation service and funeral planning service by a user, determine whether the common user data fields within entered one of the estate planning service, will preparation service, and funeral planning service are synchronized with the common user data fields of the user profile stored in the database, the common user data fields being determined according to the generated table;

responsive to determining that one or more of the common user data fields within the entered one of the estate planning service, will preparation service and funeral planning service is not synchronized with the common user data fields of the user profile, synchronize the one or more of the common user data fields within the entered one of the estate planning service, will preparation service, and funeral planning service with the common user data fields of the user profile stored in the database;

responsive to exiting by the user of the entered one of the estate planning service, will preparation service and funeral planning service, determine whether any of the common user data fields within the estate planning service, will preparation service, and funeral planning service have been changed by user input via the common graphical user interface on the user terminal;

responsive to determining that one or more of the common user data fields within the entered one of the estate planning service, will preparation service and funeral planning service have been changed, prompt the user to replace the data in the common user data field in the user profile with the changed data from the entered one of the estate planning service, will preparation service and funeral planning service;

responsive to receiving user agreement to change the common user data field in response to the prompting of the user, synchronize the corresponding common user data fields of the user profile stored in the database that have been changed in the entered one of the estate planning service, will preparation service, and funeral planning service with the data in the common user data fields, and, absent user agreement in response to the prompting of the user, maintain the common user data fields of the user profile stored in the database without change;

receive account access information for user financial resources and store the received account access information in data fields of the user profile;

automatically, responsive to user access, use the stored account access information to access financial information of the user, and store the accessed financial information in data fields of the user profile;

calculate the assets, liabilities and net worth of the user based on the accessed financial information, and store the calculated assets, liabilities and net worth in the user profile;

responsive to entry of the estate planning service by the user, synchronize the asset data, liability data and net worth data of the fields of the estate planning service with the common user data fields of the user profile stored in the database;

receive data relating to the user based on fields of the user profile, the received data tagged with a source identifier; compare the source identifier to a database of approved sources; responsive to matching the source identifier with an approved source in the database of approved sources, automatically confirm the received data, and responsive to the confirmed data indicating a user event, access one of the estate planning service, will preparation service, and funeral planning service corresponding to the confirmed data; and responsive to the user event being the death of the user, initiate one or more of a funeral process, a probate process, a life insurance claim and notification of listed people.

4. The computer-readable medium according to claim 3, wherein the computer program product is encoded with further instructions for configuring the processor to communicate with a remote computer and to instruct the remote computer to perform one of the estate planning service, will preparation service, and funeral planning service.

5. The computer-readable medium according to claim 3, wherein the computer program product is encoded with further instructions for configuring the processor to provide a cost of planned funeral arrangements, and to recommend creation of a funeral services fund for paying the cost of planned funeral arrangements.

6. A computer system in communication with an employee terminal, the system comprising:
   an employee terminal;
   an estate planning server providing an estate planning service;
   a will preparation server providing a will preparation service;
   a funeral planning server providing a funeral planning service;
   a data storage device comprising: an employee database associated with a group benefits plan; and a program for execution by a processor; and a database storing an employee profile comprising user data fields; and
   a processor in communication with the data storage device, the employee terminal, the estate planning server, the will preparation server and the funeral planning server, wherein the processor executes the program to:
   generate a common graphical user interface on the employee terminal for accessing the estate planning service, will preparation service, and funeral planning service, and receiving user data;
   automatically populate at least a portion of the user data fields of the employee profile from records stored in the employee database;
   map common fields between the employee profile and one or more of the estate planning service, will preparation service and funeral planning service, by automated comparison of field values and data labels;
   based on the mapping, generate a table dynamically linking each common field of the employee profile to a corresponding field in each of the estate planning service, will preparation service and funeral planning service;
   responsive to entry of one of the estate planning service, will preparation service and funeral planning service by a user, determine whether the common user data fields within the entered one of the estate planning service, will preparation service, and funeral planning service are synchronized with the common user data fields of the employee profile stored in the database, the common user data fields being determined according to the generated table;
   responsive to determining that one or more of the common user data fields within the entered one of the estate planning service, will preparation service and funeral planning service is not synchronized with the common user data fields of the employee profile, synchronize the one or more common user data fields within the entered one of the estate planning service, will preparation service, and funeral planning service with the common user data fields of the employee profile stored in the database;
   responsive to exiting by the user of the entered one of the estate planning service, will preparation service and funeral planning service, determine whether any of the common user data fields within the entered one of the estate planning service, will preparation service, and funeral planning service have been changed by user input via the common graphical user interface on the employee terminal;
   responsive to determining that one or more of the common user data fields within the entered one of the estate planning service, will preparation service and funeral planning service have been changed, prompt the user to replace the data in the common user data field in the employee profile with the changed data from the entered one of the estate planning service, will preparation service and funeral planning service;
   responsive to receiving user agreement to change the common user data field in response to the prompting of the user, synchronize the corresponding common user data fields of the employee profile stored in the database that have been changed in the entered one of the estate planning service, will preparation service, and funeral planning service with the data in the common user data fields, and, absent user agreement in response to the prompting of the user, maintain the common user data fields of the employee profile stored in the database without change;
   receive account access information for user financial resources and store the received account access information in data fields of the employee profile;
   automatically, responsive to user access, use the stored account access information to access financial information of the user, and store the accessed financial information in data fields of the employee profile;
   calculate the assets, liabilities and net worth of the user based on the accessed financial information, and store the calculated assets, liabilities and net worth in the employee profile;
   responsive to entry of the estate planning service by the user, synchronize the asset data, liability data and net worth data of the fields of the estate planning service with the common user data fields of the employee profile stored in the database;
   receive data relating to the employee based on fields of the employee profile, the received data tagged with a source identifier; compare the source identifier to a database of approved sources; responsive to matching the source identifier with an approved source in the database of approved sources, automatically confirm the received data, and responsive to the confirmed data indicating a life event of the employee, access one of the estate planning service, will preparation service, and funeral planning service corresponding to the confirmed data; and
   responsive to the life event of the employee, update the employee profile stored in the database.

7. The system according to claim 6, wherein the processor further provides the cost of planned funeral arrangements, and recommends creation of a funeral services fund for paying the cost of planned funeral arrangements.

8. A method for providing at least one of a plurality of advance life planning and management services, said method comprising the steps of:
   providing a processor and an insurance company database storing user data fields of a plurality of employees insured by an employer's group insurance plan;
   placing the processor in communication with the database, an employee terminal, an estate planning server providing an estate planning service, a will preparation server providing a will preparation service, and a funeral planning server providing a funeral planning service, and a database comprising a plurality of employee profiles, each of the profiles comprising user data fields; and
   configuring the processor to perform a method comprising the steps of:
      providing a common graphical user interface on the employee terminal for accessing the estate planning service, will preparation service, and funeral planning service, and receiving user data, where the estate planning service, will preparation service, and funeral planning service use data fields in common with the employee profile stored in the database;

automatically populating at least a portion of the user data fields of the employee profiles from records stored in the employee database;

mapping common fields between the employee profile and one or more of the estate planning service, will preparation service and funeral planning service, by automated comparison of field values and data labels;

based on the mapping, generating a table dynamically linking each common field of the employee profile to a corresponding field in each of the estate planning service, will preparation service and funeral planning service;

responsive to entry of one of the estate planning service, will preparation service and funeral planning service by a user, determining whether the common user data fields within the entered one of the estate planning service, will preparation service, and funeral planning service are synchronized with the common user data fields of the employee profile, the common user data fields being determined according to the generated table;

responsive to determining that one or more of the common user data fields within the entered one of the estate planning service, will preparation service and funeral planning service is not synchronized with the common user data fields of the employee profile, synchronizing the common user data fields within the estate planning service, will preparation service, and funeral planning service with the common user data fields of the employee profile;

responsive to exiting by the user of the entered one of the estate planning service, will preparation service and funeral planning service, determining whether any of the common user data fields within the entered one of the estate planning service, will preparation service, and funeral planning service have been changed by user input via the common graphical user interface on the employee terminal, the common user data fields being determined according to the generated table;

responsive to determining that one or more of the common user data fields within the entered one of the estate planning service, will preparation service and funeral planning service have been changed, prompt the user to replace the data in the common user data field in the employee profile with the changed data from the entered one of the estate planning service, will preparation service and funeral planning service;

responsive to receiving user agreement to change the common user data field in response to the prompting of the user, synchronizing the common user data fields of the employee profile stored in the database that have been changed in the entered one of the estate planning service, will preparation service, and funeral planning service with the data in the common user data fields, and, absent user agreement in response to the prompting of the user, maintain the common user data fields of the employee profile stored in the database without change;

receiving account access information for user financial resources and store the received account access information in data fields of the employee profile;

automatically, responsive to user access, using the stored account access information to access financial information of the user, and storing the accessed financial information in data fields of the employee profile;

calculating the assets, liabilities and net worth of the employee based on the accessed financial information, and storing the calculated assets, liabilities and net worth in the employee profile;

responsive to entry of the estate planning service by the user, synchronizing the asset data, liability data and net worth data of the fields of the estate planning service with the common user data fields of the user profile stored in the database;

receive data relating to the employee based on fields of the employee profile, the received data tagged with a source identifier; compare the source identifier to a database of approved sources; responsive to matching the source identifier with an approved source in the database of approved sources, automatically confirm the received data, and responsive to the confirmed data indicating a life event of the employee, access one of the estate planning service, will preparation service, and funeral planning service corresponding to the confirmed data;

and responsive to the life event of the employee, updating the employee profile stored in the database.

9. The method according to claim 8, wherein the step of configuring the processor further includes configuring the processor to provide a cost of planned funeral arrangements, and to recommend creation of a funeral services fund for paying the cost of planned funeral arrangements.

* * * * *